US009146668B2

(12) United States Patent
Walsh et al.

(10) Patent No.: US 9,146,668 B2
(45) Date of Patent: Sep. 29, 2015

(54) GRAPHICAL ELEMENT PLACEMENT ON A DISPLAY SURFACE

(71) Applicant: Hewlett-Packard Development Company, L.P., Houston, TX (US)

(72) Inventors: Robert Walsh, San Diego, CA (US); Laurel Lasslo, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 13/755,035

(22) Filed: Jan. 31, 2013

(65) Prior Publication Data

US 2014/0215389 A1     Jul. 31, 2014

(51) Int. Cl.
    *G06F 3/0488*    (2013.01)
(52) U.S. Cl.
    CPC .................................. *G06F 3/0488* (2013.01)
(58) Field of Classification Search
    CPC .................................................... G06F 3/0488
    USPC .................................................. 715/702, 808
    See application file for complete search history.

(56) References Cited

U.S. PATENT DOCUMENTS

| 7,023,536 | B2 | 4/2006 | Zhang et al. | |
|---|---|---|---|---|
| 7,038,846 | B2 | 5/2006 | Mandella et al. | |
| 7,088,440 | B2 | 8/2006 | Buermann et al. | |
| 7,110,100 | B2 | 9/2006 | Buermann et al. | |
| 7,113,270 | B2 | 9/2006 | Buermann et al. | |
| 7,161,664 | B2 | 1/2007 | Buermann et al. | |
| 7,203,384 | B2 | 4/2007 | Carl et al. | |
| 7,268,956 | B2 | 9/2007 | Mandella et al. | |
| 7,474,809 | B2 | 1/2009 | Carl et al. | |
| 7,729,515 | B2 | 6/2010 | Mandella et al. | |
| 7,770,135 | B2 | 8/2010 | Fitzmaurice | |
| 7,826,641 | B2 | 11/2010 | Mandella et al. | |
| 7,961,909 | B2 | 6/2011 | Mandella et al. | |
| 7,979,902 | B2 * | 7/2011 | Chakra et al. | 726/17 |
| 8,407,577 | B1 * | 3/2013 | Franklin et al. | 715/208 |
| 8,427,424 | B2 * | 4/2013 | Hartmann et al. | 345/156 |
| 2002/0126161 | A1 * | 9/2002 | Kuzunuki et al. | 345/863 |
| 2005/0168437 | A1 | 8/2005 | Carl et al. | |
| 2008/0229194 | A1 * | 9/2008 | Boler et al. | 715/700 |
| 2009/0094515 | A1 * | 4/2009 | Do et al. | 715/273 |
| 2009/0276734 | A1 * | 11/2009 | Taylor et al. | 715/863 |
| 2010/0079414 | A1 * | 4/2010 | Ferlitsch | 345/179 |
| 2010/0177931 | A1 * | 7/2010 | Whytock et al. | 382/103 |
| 2011/0041177 | A1 | 2/2011 | Pereira | |
| 2011/0134047 | A1 * | 6/2011 | Wigdor et al. | 345/173 |
| 2011/0227915 | A1 | 9/2011 | Mandella et al. | |

(Continued)

OTHER PUBLICATIONS

Peng Song et al, "A Tangible Game Interface Using Projector-Camera Systems," (Research Paper), Proceedings of the 12th International Conference on Human-Computer Interaction: Interaction Platforms and Techniques, 2007, pp. 956-965, Available at: <stefan.winkler.net/Publications/Incs4551.pdf>.

(Continued)

*Primary Examiner* — Omar Abdul-Ali
(74) *Attorney, Agent, or Firm* — Hewlett-Packard Patent Department (57) ABSTRACT

An example processor-implemented method for placing a graphical element on a display surface in accordance with the present disclosure is receiving an image of at least part of a display surface, detecting in the received image a token placed by a user on the display surface to specify an area on the display surface, and placing the graphical element within the area specified by the placement of the token.

20 Claims, 5 Drawing Sheets

(56) References Cited

U.S. PATENT DOCUMENTS

| | | | |
|---|---|---|---|
| 2011/0248963 | A1 | 10/2011 | Lawrence et al. |
| 2012/0038549 | A1 | 2/2012 | Mandella et al. |
| 2012/0042288 | A1 | 2/2012 | Liao et al. |
| 2012/0044140 | A1 | 2/2012 | Koyama et al. |
| 2012/0331415 | A1* | 12/2012 | Hillis et al. ............... 715/781 |
| 2013/0194418 | A1 | 8/2013 | Gonzalez-Banos et al. |

OTHER PUBLICATIONS

Xiangyu Wang, "Using Cognitive Walkthrough Procedure to Prototype and Evaluate Dynamic Menu Interfaces: a Design Improvement," (Research Paper), 12th International Conference on Computer Supported Cooperative Work in Design, Apr. 16-18, 2008, pp. 76-80, Available at: <ieeexplore.ieee.org/stamp/stamp.jsp?tp=&arnumber=4536959>.

Gao, Rui et al; Microsoft Research-Mobile Surface; Microsoft Research; 2010; http://research.microsoft.com/en-us/projects/mobilesurface/.

Hand, Randail; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/peopie/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research-IliumiShare; Microsoft Research; 2012; http://delivery.acm.org/10.114.5/2210000/2208333/p1919-junuzovic.pdf?ip=15.219.153.76&id=2208333&acc=ACTIVE%20SERVICE&key=C2716FEBFA981EF153FE223D54A46A411F9E1F05F1DA6F38&CFID=271558808&CFTOKEN=96334302&_acm_=1387226323_00af7aa5e159c7c67d724c49ef01bacf.

Kane, Shaun K. et al; Bonfire: A Nomadic System for Hybrid Laptop-Tabletop Interaction; UIST'09 Oct. 4, 2009; Victoria, British Columbia, Canada; http://dub.washington.edu/djangosite/media/papers/uist09.pdf.

Linder, Nolan et al; LurminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working On Portable Surface; Mar. 2, 2010; http://www.engadget.com/2010/03/02/microsoft-research-working-on-portable-surface/.

Melanson, Donald; Wiimote Repurposed for Multi-Point interactive Whiteboard; Dec. 10, 2007; http://www.engadget.com/2007/12/10/wiimote-repurposed-for-multi-point-interactive-whiteboard/.

Simonite, Tom; A Kitchen Countertop With A Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions On, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using A Depth Camera As A Touch Sensor; Its 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

Fig. 5

GRAPHICAL ELEMENT PLACEMENT ON A DISPLAY SURFACE

BACKGROUND

Graphical user interfaces are used for the interaction between a user and computer. They represent a virtual control and display panel through which the user transmits commands or information to the computer, the computer in turn signaling back the receipt of these commands and information and/or the response thereto. For the operation and rapid navigation of the interaction, the control and display objects, such as text boxes, menus, selection lists, buttons, icons, etc. can be used. For example, pop-up menus are very popular in many interfaces for executing various groups of computer commands. The computer may display a pop-up menu over a display screen, and the user can then select and execute one of the commands contained in the pop-up menu.

These pop-up menus can be used in projector-camera systems. Cameras are often combined with projectors to form projector-camera systems, or procam systems. As a projector projects an output image on a display surface, a camera acquires an input image of the output image. Pop-up menus can be displayed on the output image over the display surface.

BRIEF DESCRIPTION OF THE DRAWINGS

Example implementations are described in the following detailed description and in reference to the drawings, in which.

DETAILED DESCRIPTION

Various implementations described herein are directed to placement of graphic elements on display surfaces. More specifically, and as described in greater detail below, various aspects of the present disclosure are directed to a manner by which pop-up menus may be placed on a display surface in a projector-camera system by using a physical token placed by a user on the display surface. This approach allows the user to identify where and when the pop-up menus should be placed on the display surface without such menus dissolving into or being blocked by the projected image.

Aspects of the present disclosure described herein place a pop-up menu on a display surface specifically in the area that a user identifies by using a token. Among other things, this approach may prevent the pop-up menu being occluded by any underlying text or picture, obscured by proximate colors, or warped over objects or otherwise distracting the user.

In one example in accordance with the present disclosure, a method for placing a graphical element on a display surface is provided. The method comprises receiving an image of at least part of a display surface, detecting in the received image a token placed by a user on the display surface to specify an area on the display surface, and placing the graphical element within the area specified by the placement of the token.

In another example in accordance with the present disclosure, a projector-camera system is provided. The system comprises a projector, a camera, a memory and a processor. The projector is configured to project an image received from a processor. The camera is configured to capture an image of a token placed by a user on the display surface. The token is used to specify an area on the display surface. The projector has a field of projection on a display surface, and the camera has a camera field of view. The camera field of view of the camera intersects the projector field of projection of the projector on the display surface. The memory is configured to store instructions. The processor is in communication with the memory, and configured to issue a plurality of processing instructions stored in the memory. Further, the processor issues instructions to receive an image of at least part of a display surface, detect in the received image a token placed by a user on the display surface to specify an area on the display surface, and place the graphical element within the area specified by the placement of the token.

In a further example in accordance with the present disclosure, a non-transitory computer-readable medium is provided. The non-transitory computer-readable medium comprises instructions that when executed cause a device to (i) receive an image of at least part of a display surface, (ii) detect in the received image a token placed by a user on the display surface to specify an area on the display surface, and (iii) place the graphical element within the area specified by the placement of the token.

Figure 1:
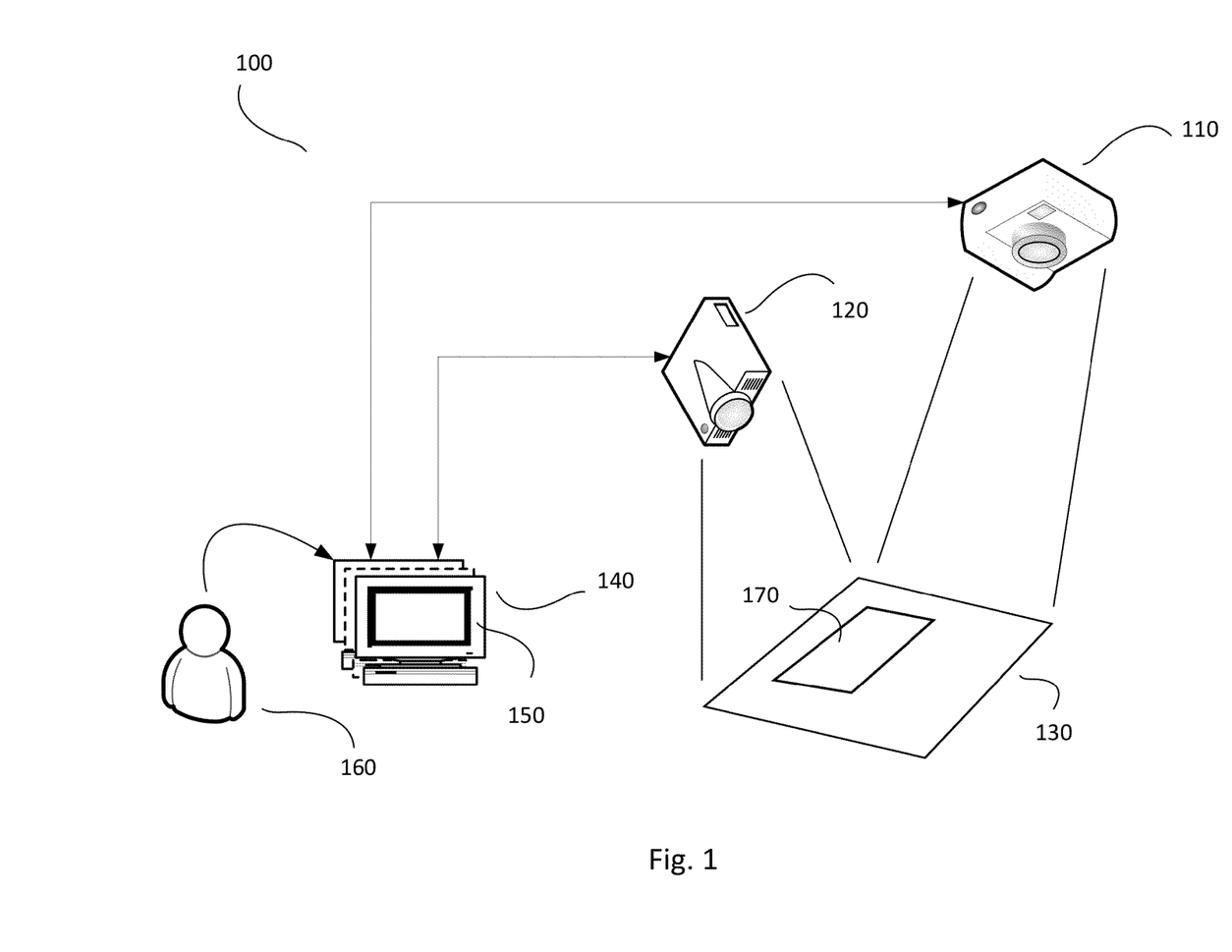
FIG. 1 illustrates an example system in accordance with an implementation.

FIG. 1 illustrates an example system 100 in accordance with an implementation. The system 100 comprises a camera 110, a projector 120, a display surface 130, a computer 140 with a user interface 150 and a token 170, each of which is described in greater detail below. It should be readily apparent that the system 100 depicted in FIG. 1 represents a generalized illustration and that other components may be added or existing components may be removed, modified, or rearranged without departing from a scope of the present disclosure. For example, while the system 100 illustrated in FIG. 1 includes only one camera 110, the system may actually comprise a plurality of cameras, and only one has been shown and described for simplicity. In another implementation, the camera 110 may be any type of an image capturing device.

In some implementations, a user 160 may interact with the system 100 by controlling an input device for the computer (e.g., keyboard, mouse, etc.) or using the touch sensitive display surface. The user interface 150 may be a display of the computer 140. In one example system, such display may present various pages that represent applications available to the user 160. The user interface 150 may facilitate interactions between the user 160 and computer systems by inviting and responding to user input and translating tasks and results to a language or image that the user 160 can understand. Additionally, the computer 140 may receive input from a plurality of input devices, such as a keyboard, mouse, touch device or verbal command.

The camera 110 and the projector 120 may be positioned across the display surface 130 where at least one image may be projected or an object may be placed. In one implementation, as the projector 120 projects an output image on the display surface 130, the camera 110 may acquire an input image of the output image. In some implementations, the camera 110 and the projector 120 are connected to the computer 140. The camera 110 may capture a visual input of a projected image from the projector 120 and relay such visual input to the computer 140. The projected image may be a static or dynamic image comprising text and/or graphics present in virtual objects, such as word documents, photos, videos, maps, etc. In other implementations, the camera 110 may capture a visual input of an image of a physical object present on the display surface 130 and relay such visual input to the computer 140. The physical object image can include text and/or graphics on real objects, such on paper, board, box, coins, blocks, game pieces or any other object in any material, size, shape or color.

The computer 140 may be a user device that connects to the camera 110 and the projector 120 (e.g., a laptop, desktop, tablet, smart phone, medical instrument, scientific instrument, etc.). It should be noted that the computer 140 is intended to be representative of a broad category of data processors. The computer 140 may include a processor and memory and help translate visual input received by the camera 120 into appropriate feedback for the projector 120 or as an input to the computer 140 itself. In another example system, the camera 110 and projector 120 may also be capable of individually processing the input of a projected image received by the camera 110 and translating the input into visual feedback at the projector 120. The camera 110 may process the image on the display surface 130 and may be capable of recognizing the user 160's finger or any other gesture and remotely detecting presence of an object. Alternatively or in addition, the projector 120 may provide visual feedback directly in an area on the display surface 130 based on the recognized gestures or other input from the computer 140.

In some implementations, the camera 110 and projector 120 may be integrated into a single, portable projector-camera unit. The single projector-camera unit may be combined with the computer device 140, such as a laptop, tablet or cell phone. In another example implementation, the projector 120 and/or camera 110 may be connected to the computer 140, via, for example, a USB cable. In a further example implementation, the camera 110 and/or projector 120 could also be an embedded part of the computer 140.

The display surface 130 may be any type of user interface, screen, monitor, television, panel, board, curtain, wall, table, carpet, floor or any other surface that can be utilized to project an image. The system 100 may provide for interaction by allowing the user 160 to interact with the display surface 130. For instance, the user 160 may apply finger or hand gestures or place a token 170 on the display surface 130. The token 170 may comprise, for example, a physical object such a rectangular white board or any other object in any material, size, shape or color.

Figure 2:
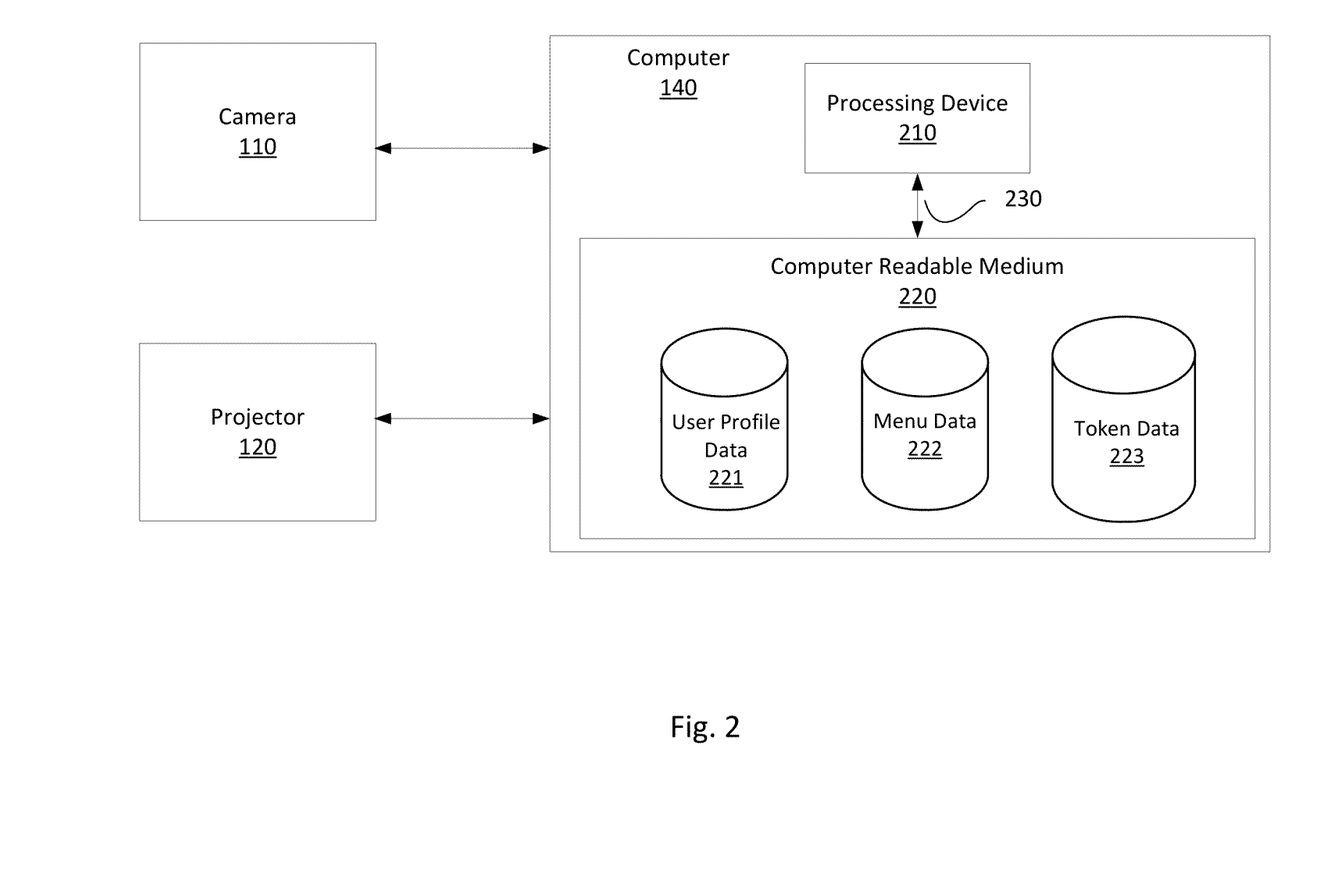
FIG. 2 illustrates an example display surface of an example system in accordance with an implementation.

FIG. 2 illustrates example components of the system 100 in accordance with an implementation. It should be readily apparent that the computer 140 illustrated in FIG. 2 represents a generalized depiction and that other components may be added or existing components may be removed, modified, or rearranged without departing from a scope of the present disclosure. The computer 140 comprises a processor 210, and a computer readable medium 220, each of which is described in greater detail below. The processor 210 and a computer readable medium 220 may be connected via a bus 230. The computer readable medium 220 may comprise various databases containing, for example, user profile data 221, menu data 222 and token data 223.

The processor 210 may retrieve and execute instructions stored in the computer readable medium 220. The processor 210 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium, or a combination thereof. The processor 210 may fetch, decode, and execute instructions stored on the storage medium 220 to operate the computer 140 in accordance with the above-described examples. The computer readable medium 220 may be a non-transitory computer-readable medium that stores machine readable instructions, codes, data, and/or other information.

In certain implementations, the computer readable medium 220 may be integrated with the processor 210, while in other implementations, the computer readable medium 220 and the processor 210 may be discrete units.

Further, the computer readable medium 220 may participate in providing instructions to the processor 210 for execution. The computer readable medium 220 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

In one implementation, the computer readable medium 220 may have a user profile database, a menu database and a token database. The user database may store user profile data 221 such as user authentication data, user interface data, and profile management data and/or the like. In one implementation, user authentication data may comprise (i) group membership information (e.g., authuser, finance, management), (ii) authorization information (e.g., unauthorized, authorized, forbid/blocked, guest, or quarantined), and/or (iii) security keys (e.g., 1a2b3c4d). The menu database stores menu data 222 such as menu items, menu settings and/or the like. The token database may store token data 223 such as token images, token descriptions, token dimensions, and/or the like. To create a high level of security, packet filter access can be installed between databases. Consistent with the present invention, the databases could be maintained as a single database.

The processor 210 may comprise at least one high-speed data processor adequate to execute program components for executing user and/or system-generated requests. In one implementation, the processor 210 may include a software module that processes the images captured by the camera 110 from a display surface. This module may also be used to detect any objects present on the image being captured by the camera 110. Moreover, the processor 210 may also include a software module that generates projection images and instruct the projector 120 to project them onto a display surface. Alternatively or in addition, the processor 210 may provide a way for a user to interact with the display surface by allowing the user to place a token (e.g., a rectangular white board as described below in more detail as one example in FIG. 3) on the display surface and coordinating to display a pop-up menu with a selection of menu items on the display surface that the user can view and select from.

In some implementations, the processor 210 may employ an object recognition system based on, for instance, the RANSAC ("RANdom SAmple Consensus") algorithm to detect and recognize a token that the user places on the projected image or the display surface. In one implementation, the camera 110 may capture an image of the display surface or at least part of the display surface and transmit it to the processor 210. After receiving the image from the camera 110, the processor 210 may examine the image and segment the image of the token. The processor 210 may feed the token image into a machine-learning algorithm, which has previously been trained by a database of images (i.e., token data 223). The algorithm compares that token image to other object images (i.e., token data 223) stored in the computer readable medium 220 by: 1) extracting characteristic points as recognition elements in the token image and a comparative object image; and 2) comparing the characteristic point in the token image with the characteristic point in the comparative object image. In this comparison between the characteristic points, a method such as RANSAC may be used to judge whether the value of similarity between the images exceeds a threshold value set to a predetermined value as a satisfaction of data. Having recognized the token by finding a comparative object image with sufficient correlation to the token image, the processor 210 may classify the token. In other implementations, other recognition algorithms may be used, such as algorithms based on optical flow or corner features of the projected images.

In another implementation, the processor 210 may employ an object recognition system based on, for instance, the FAST (Features from Accelerated Segment Test). FAST, which is a corner detection algorithm based on the AST (Accelerated Segment Test) and has computational efficiency, could be used to extract feature points and later used to track and identify objects.

In some implementations, the recognition process of the token may fail due to bad lighting conditions, paper distortion and non-indexed objects. In case of a non-indexed token which is not present in the database (i.e., computer readable medium 220), the image of the token may be included with the token data 223 and stored in the computer readable medium 220. The user switches the camera to a still image mode, takes high resolution photography of the object and manually indexes in it in the database.

In another implementation, the processor 210 may also interpret the token to identify any data associated with such token, which may include, but not limited to, token data 223 and menu data 222 such as menu items and menu settings for a menu that may be displayed over an area that the token is used to identify on the display surface.

In the event that the token data 223 associated with the token is found in the database and therefore is identified, but no menu data 222 is found associated with the token, the system resorts to using a generic menu, including generic menu items and settings.

In one implementation, the camera 110 may include a processor, memory and a corresponding software module that processes the images captured by the camera 110. Similarly, the projector 120 may include a corresponding processing software module. As a result of the input from the camera 110, the software module in projector 120 may generate a projection image on the display surface for direct visual feedback to the user. The camera processing module may recognize the projected image as well as tracking the movement of the image in order to adjust the visual output of the projector.

Figure 3:
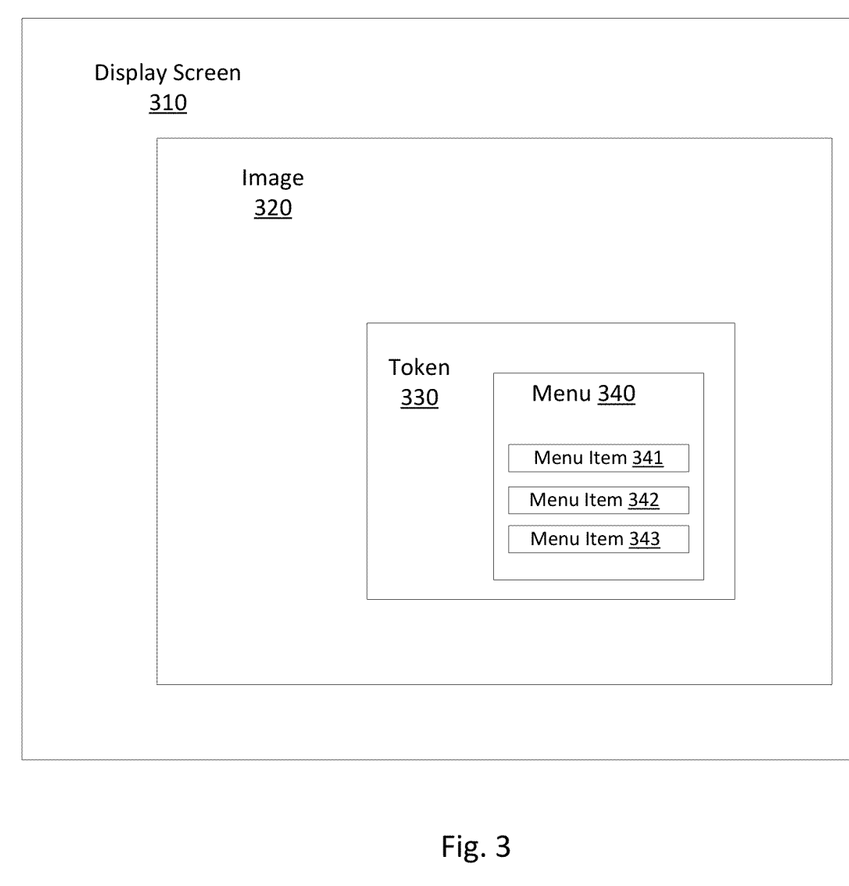
FIG. 3 illustrates example components of an example system in accordance with an implementation.

FIG. 3 illustrates an example of a display surface 310 in accordance with one implementation. It should be understood that the display surface 310 represents a generalized depiction and that other components may be added or existing components may be removed, modified, or rearranged without departing from a scope of the present disclosure. FIG. 3 includes a display surface 310, an image 320, a token 330 and a pop-up menu 340 with menu items 341, 342 and 343.

As also described above in greater detail with reference to FIG. 1, the display surface 310 of a projector may be a screen, monitor, television, panel, board, curtain, wall or any other surface that can be utilized to receive a projected image. Moreover, the display surface 310 may include, without limitation, a generally planar substrate. The display surface 310 may include virtually any shape or configuration of color-correcting surface, including curved forms. The display surface 310 may include a generally rigid substrate, or alternatively, the substrate may be a flexible substrate. Where the substrate is flexible, the display surface 310 may be configured to be rolled up for transportation or storage, such as for a portable projection screen, or a projection screen that may be raised and lowered. Even where the substrate is generally rigid, the resulting projection screen may be configured to be portable, such as for use in tradeshows or other presentations.

As described above in greater detail with reference to FIG. 1, in one implementation, as shown in FIG. 3, the display surface 310 may receive the image 320 that may be projected by a projector. The image 320 may be any type of 2D or 3D image that can be projected, including photographs, moving video, animations, maps, text or any content that may be seen, for example, on the screen of a computer or a television or similar sources. In another implementation, which is not shown in FIG. 3, the image 320 may be a physical object, such as a cube or a coin, placed on the display surface 310.

In one implementation, a user may interact with the image 320 by, for instance, choosing to place the token 330 on the image 320 or somewhere else relative to the image 320 on the display surface 201. The token 330 may comprise, for example, a rectangular white board, or any other object in any material, size or color. The menu 340 may be placed on the area that the token 330 is used to specify. Such area may be directly on the token 330 or somewhere else on the display surface that the token 330 is used to specify.

In another implementation, the user may choose to place more than one token over the projected image 320, and various visual clues may be used to identify the token that the user intended for placing a menu. For example, the token 330 may have visual markings which may take the form of a barcode, a QR code or a simple set of markers such as dots or any other visual identifiers (which are not illustrated in FIG. 3). In some implementations, such visual markings may also identify the boundaries of an area that the menu 340 with various menu items (i.e., menu items 341, 342 and 343) may be placed. In another implementation, the visual clues may include marking the token 330 with an arrow to further indicate the direction that the menu 340 may be placed relative to the token 330.

The menu 340 may be a graphical element, including dialogs within a computer program. Appropriate programming of computer is provided such that a plurality of menu buttons and/or single button functions may be displayed within the menu 340. For example, the menu 340 may include a variety of menu items such as menu items 341, 342 and 343, which may be data within the bounded menu window in the form of graphics, text and symbols and correspond to executable functions by a processor (e.g., the processor 210 as described in FIG. 2). It should be understood that the menu items shown in FIG. 3 are exemplary and are deemed to be non-limiting.

In one implementation, the menu items 341, 342 and 343 may be sensitive fields on the pop-up menu 340 and may consist of a text string, a text character or symbol (icon), the immediate vicinity of the text string, the text character or the symbol being characterized as a sensitive field. The menu items 341, 342 and 343 disposed within the menu 340 may include such functions as "cut", "copy", "paste", "again", "undo", "edit", "file", "view", "find", "properties", and "delete".

In certain implementations, the menu items 341, 342 and 343 may be determined by the system or may be chosen at least in part by the user. For example, the menu items 341, 342 and 343 may include settings which can be preset by the system or changed at least in part by the user so that the commands corresponding to the menu items 341, 342 and 343 are required by the user. As a result, the menu items 341, 342 and 343 displayed for one user may be different than the menu items 341, 342 and 343 for another user.

Moreover, in addition to the menu items (contextual commands), the user may choose to modify the visual appearance of the menu 340 such as color and size. As described in greater detail above with reference to FIG. 2, the data related to the menu settings including the user's selection of menu items may be collected and stored in the computer without departing from the scope of the present disclosure. Such data may be stored with all the other data related to the user. In some implementations, it should be noted that the data may be stored in an encrypted manner within the computer. For example, encrypting may be accomplished by the use of networking technology (e.g., by using SSL and/or https protocols, etc.). Moreover, the historical data related to menu settings may be stored to be used in the event that a current menu setting cannot be implemented and an earlier menu setting may need to be utilized.

In another implementation, the menu items 341, 342 and 343 of the menu 340 may be determined based on the token 330, and the settings for the menu 340 may be set or changed based on the token 330.

In some implementations, the activation and selection of the menu items 341, 342 and 343 may be carried out via various selection means with a user hand or finger, touch screens, computer mouse, trackballs, or defined or definable key combinations. The selection of a menu item by the user may result in the immediate execution of the function by a processor. For example, the placement of a finger over the "delete" menu item by a user interacting with the projected image may result in the computer executing the delete function of the projected image.

In one implementation, the menu 340 may require a specification as to the number of visible rows. The amount of menu items to be presented may determine the number of visible rows. For example, FIG. 3 illustrates the menu 340 having three visible rows as it includes the menu items 341, 342 and 343. The menu 340 may require a certain amount of display space in its default state. In another implementation, the menu may be a list box with a specification of the number of visible rows in a viewing area over the token.

In one implementation, if the size of the area identified by using the token is smaller than the size of the menu, the user may choose to adjust the size of the menu to a smaller size to fit into the area identified by the token. However, when the size of the menu is adjusted, the previously visible menu items may not be visible anymore. A scroll bar may be created. The scroll bar may permit the user to traverse all the menu items on the menu 340 by moving a slider element.

Although the examples described herein have focused on pop-up menus in projector-camera systems for illustrative purposes, the same approach may be adapted for, for example, augmented reality systems which include a technology in which a user's perception of the real world is enhanced with additional information generated from a computer model. An augmented reality system allows a user to examine the real objects, while receiving additional information about such objects through a display, e.g., a monitor or head-mounted display. Pop-up menus may be used to allow a user to interact with the system and communicate action commands related to the display. In one implementation, the user may insert a token over the display to identify the space that the system may place the menu.

Depending on the implementation, security features/tools may be implemented in various ways such as by a firewall, one time passwords, encryption programs, digital certificates, user application security, etc. Various combinations of these and/or other security features may be used. In one implementation, these security approaches may be layered to provide a highly secure environment in which a user can interact with the display surface 310. For example, the security features may require a user to log in before activating the display surface 310 or displaying or capturing the image 320 over the display surface 310. In other implementations, the security features may require the user to log in in order to determine whether the user has permission to interact with the menu 340 and select any of the menu items 341, 342 or 343 once the menu 340 is placed over the area identified by the token 330 on the display surface 310.

Figure 4:
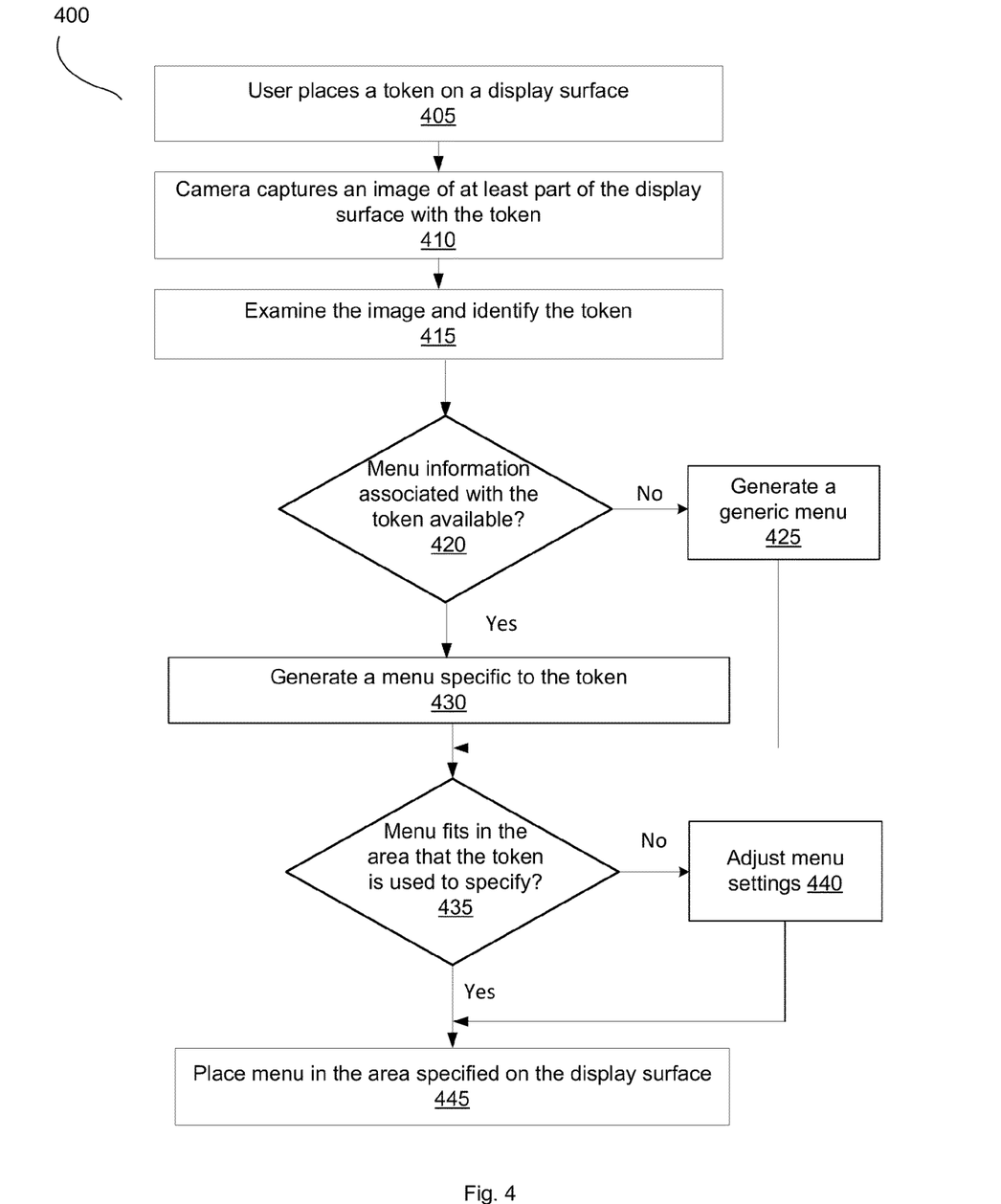
FIG. 4 is an example process flow diagram in accordance with an implementation.

Turning now to the operation of the system 100, FIG. 4 illustrates an example process flow diagram 400 in accordance with an implementation. More specifically, FIG. 4 illustrates processes that may be conducted by the system 100 in accordance with an implementation. It should be readily apparent that the processes illustrated in FIG. 4 represents generalized illustrations, and that other processes may be added or existing processes may be removed, modified, or rearranged without departing from the scope and spirit of the present disclosure. Further, it should be understood that the processes may represent executable instructions stored on memory that may cause a processor to respond, to perform actions, to change states, and/or to make decisions. Thus, the described processes may be implemented as executable instructions and/or operations provided by a memory associated with a system 100. Alternatively or in addition, the processes may represent functions and/or actions performed by functionally equivalent circuits like an analog circuit, a digital signal processor circuit, an application specific integrated circuit (ASIC), or other logic devices associated with the system 100. Furthermore, FIG. 4 is not intended to limit the implementation of the described implementations, but rather the figure illustrates functional information one skilled in the art could use to design/fabricate circuits, generate software, or use a combination of hardware and software to perform the illustrated processes.

The process 400 may begin at block 405, where a user to places a token over a display surface. In particular, this process may involve the user, for example, establishing a projected image of at least part of a display surface from a projector in a projector-camera system, identifying a token and inserting the token over a desired area on the display surface. As mentioned above, the user may be, e.g., a person such as an administrator of a computer and/or an automated machine capable of moving physical objects. As further mentioned above, the token may be, e.g., a rectangular white board. In another embodiment, this process may involve having various physical objects on the display surface and the user inserting a token over a desirable area relative to the physical objects on the display surface.

At block 410, a camera captures an image of the display surface with the token and relays the captured image to the computer. At block 415, the computer receives the image from the camera and examines the image and identifies the token. As described above in greater detail with reference to FIG. 2, the computer employs an object recognition system such as RANSAC (RANdom SAmple Consensus) to detect and identify the token that the user places on the projected image. If the token is not recognized, the computer may save the image of the token in a token database so that when the user inserts the same token in the future, the computer may be able to identify it using the saved image. In addition to saving the image of the token, the computer may allow the user to select settings associated with the token, or the token may be automatically assigned a set of settings.

At block 420, after identifying the particular token, the computer determines whether menu data, including menu items and menu settings associated with the token exists. As part of the process of determining the menu, the computer issues an inquiry command to request that any data associated with the identified token be sent to the processor. Such data may include menu items, menu settings such as height, width, color, etc.

In the event that no menu data is available, at block 425, a generic menu is generated. If menu data exists, at block 430, the menu data may be retrieved from a menu database (as described in more details with respect to FIG. 2) and a menu is generated based on the retrieved menu data.

At block 435, after identifying the menu associated with the token, the computer determines whether the generated menu fits in the area identified by using the token. In one implementation, this may involve tracking the token to compute its location and orientation. It may also involve identifying the dimensions of the generated menu. In one implementation, the menu settings associated with the token may be used to determine dimension settings. After the token's dimensions are determined (e.g., computed or measured), the dimensions of the generated menu are compared to the dimensions of the token.

Alternatively, as described in more detail above with respect to FIG. 3, the token may have visual markings such as colored dots or arrows identifying the boundaries of an area on the token that the menu may be placed onto. Accordingly, in some implementations, the dimensions of this area may be computed based on the positions of the markings. Thereafter, the dimensions of the generated menu may be compared to the dimensions of the area defined by the visual markings on the token.

If it is determined that the generated menu may fit in the area identified by using the the token, at block 445, the computer places the menu in the area defined by using the token. If the area identified by using the token is smaller than the area needed for the menu, at block 440, the computer may adjust the dimensions of the menu by modifying the menu settings. In one implementation, this adjustment may comprise, for example, modifying the height and/or width of the menu to a size smaller or equal to the height and/or width of the token. As described in more detail above with respect to FIG. 3, the adjustment may also require that the visible menu items of the menu are adjusted, and a scroll down bar is used to view the menu items that were visible before but may not be visible on the menu anymore with the new dimension settings. Thereafter, at block 445, the menu may be placed over the display surface.

In one implementation, after the menu is placed, the user may select one of the menu items from the menu to request a desired action. In certain implementations, the requested action may be performed only if the user is an authorized user. In order to determine whether the user is an authorized user, the user data (e.g., username, password) may be received from the user, and the user profile associated with the user data may be obtained. Such profile may provide the security level assigned to the user. The user may be given or denied permission to interact with the menu placed in the area specified by using the token based on the user's security level.

In certain implementations, the computer may cause the menu to disappear when the token is removed from the image. Alternatively or in addition, the computer may cause the menu to disappear when the computer determines that the action is completed. For example, the computer may determine that the action has been completed because the user provides an update via a user interface that the action has been completed.

Figure 5:
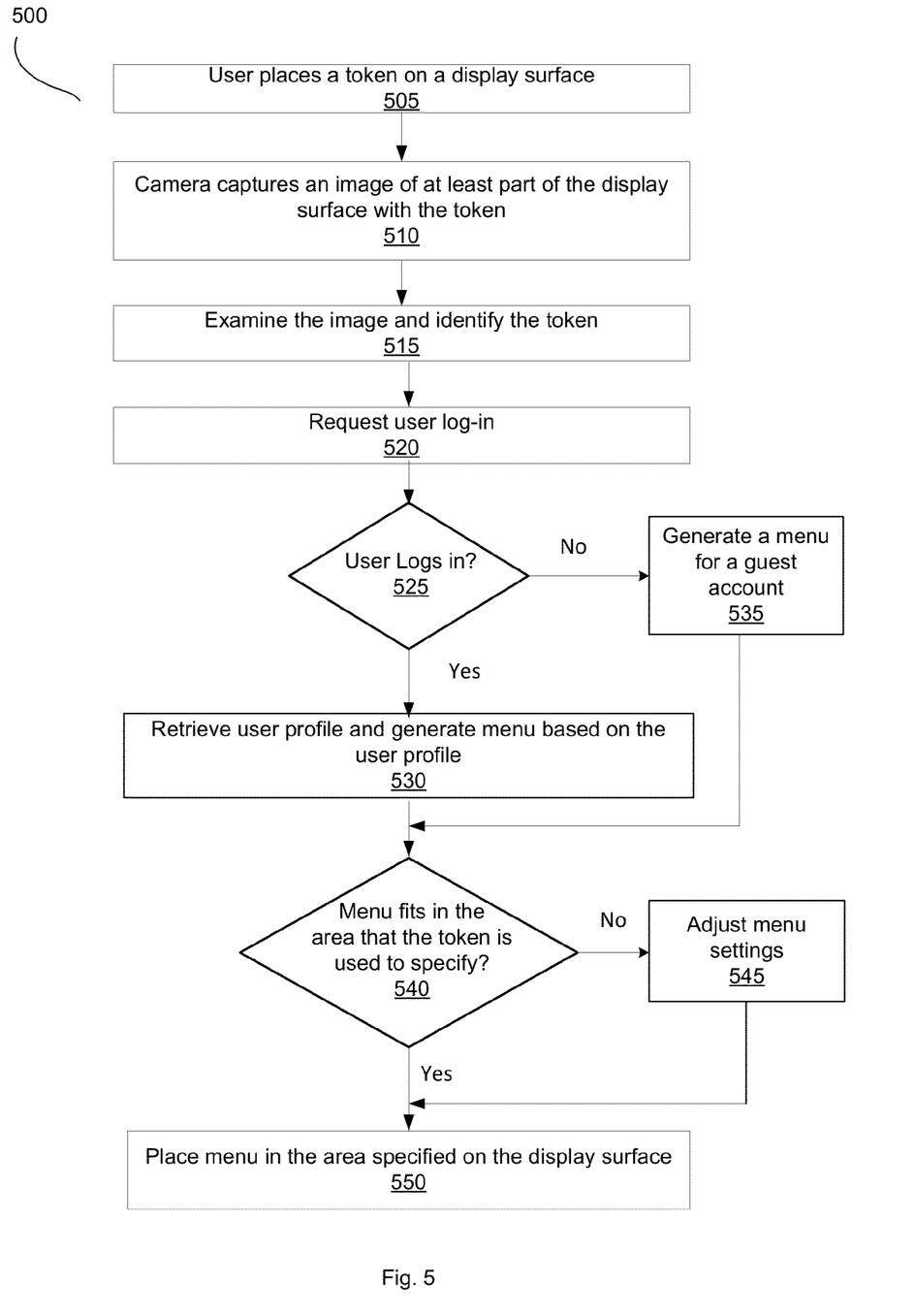
FIG. 5 is an example process flow diagram in accordance with another implementation.

FIG. 5 illustrates an example process flow diagram 500 in accordance with another implementation. Similar to FIG. 4, FIG. 5 represents generalized illustrations, and that other processes may be added or existing processes may be removed, modified, or rearranged without departing from the scope and spirit of the present disclosure.

The process 500 may begin at block 505, where a user to places a token on a display surface. At block 510, a camera captures an image of at least part of the display surface with the token and relays the captured image to the computer. At block 515, the computer receives the image from the camera and examines the image and identifies the token.

At block 520, the user is requested to log in. The inquiry command may, for example, request that the user provide a username and password. Alternatively, as part of the process of logging in, the system may receive an access request from a user. In some implementations, this process may also include the user's initiation of a process for self-enrollment/entitlements by signing up for access with the computer or specifically access with the computer program(s) associated with the procam system (e.g., the camera and projector). The user data (e.g., name, title) retrieved during the sign-up process may be stored in the user profile database. In some implementations, the user may be assigned a security level, and information related to the assigned security level may be stored in the user profile database.

At block 525, it is determined whether the user provided the required log-in data (e.g., username and password). If the log-in information from the user is obtained, at block 530, the user profile is retrieved. As mentioned above, such user profile may include, but not limited to, user's name, title, security/access level, and/or menu setting preferences. In particular, the profile retrieval process may involve, e.g., using the log-in information to locate the user profile associated with that log-in information. As described above in greater detail with reference to FIG. 2, a server may locate the user profile in a user profile database by sending a profile request to the profile database. The profile database may send a response back to the server providing the user profile.

At block 530, a menu is generated based on the user profile information. In certain implementations, once the user is logged in and the user profile is obtained, the user's security/access level may be reviewed. If it is determined based on the user's profile that the user is authorized to access the system, a menu is generated and placed in an area identified by using the token on the display surface. In the event that the user is determined to be, for example, an unauthorized or blocked user, a menu may not be generated or displayed.

In the event that the user does not log in or does not sign up to create a log in account, the system identifies the user as a guest and assigns the user a guest profile. In one implementation, a guest profile may comprise an unidentified name, an unidentified title, lowest security/access level and generic menu settings. Hence, at block 535, a generic menu is generated based on the guest account profile.

In some implementations, the security/access level of a guest profile may be set to unauthorized. Accordingly, if the user chooses to skip the log-in or sign-up process and therefore, is assigned a guest profile, the user's interaction with the system may be restricted. Thereafter, the computer may be arranged so that no menu is generated if the user does not have permission to access the system.

At block 540, after generating the menu based on the user's profile, the computer determines whether the generated menu fits in the area identified by the token. If it is determined that the generated menu may fit in the area identified by the token, at block 550, the computer may place the menu in the area specified by using the token on the display surface. If the area identified by using the token is smaller than the area needed for the menu, at block 545, the menu dimensions may be changed by modifying menu settings (e.g., modifying the height and/or width of the menu). Thereafter, at block 550, the computer places the men in the area identified by using the token on the display surface.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A method comprising:
   receiving, by a system including a processor, an image of at least part of a display surface;
   detecting, by the system, in the received image a token comprising a physical object placed by a user on the display surface, the token having a visual marking and an arrow;
   determining, by the system based on the visual marking on the token, a boundary of an area for placing a graphical element to be displayed on the display surface;
   placing, by the system, the graphical element corresponding to the token within the area specified by placement of the token on the display surface; and
   determining, based on the arrow, a direction relative to the token where the area is to be placed in a displayed image displayed on the display surface.

2. The method of claim 1, further comprising:
   receiving a selection by the user of a graphical element item, wherein the graphical element item is selected from a set of graphical element items in the graphical element, and the graphical element item identifies an action to be performed; and
   performing the action identified by the graphical element item.

3. The method of claim 2, further comprising:
   receiving user data from the user;
   retrieving a user profile associated with the user data, the user profile identifying a security level for the user; and
   determining whether to perform the action identified by the graphical element item based on the security level.

4. The method of claim 1, wherein the display surface is horizontal and the token rests on the display surface.

5. The method of claim 1, further comprising:
   identifying token data associated with the token based on the received image; and
   generating the graphical element based on the token data.

6. The method of claim 5, wherein generating the graphical element based on the token data comprises:
   checking the token data for graphical element information;
   in response to determining that the graphical element information does not exist in the token data, generating the graphical element with generic graphical element items; and
   in response to determining that the graphical element information exists in the token data, using the graphical element information to generate the graphical element.

7. The method of claim 5,
   wherein the token data comprises information defining dimensions of the graphical element; and
   wherein generating the graphical element based on the token data comprises generating the graphical element based on the information defining the dimensions of the graphical element.

8. The method of claim 5,
   wherein the token data comprises at least one graphical element item and graphical element settings; and
   wherein identifying the token data associated with the token based on the received image comprises:
      examining an image of the token to recognize the token; and
      obtaining the at least one graphical element item and the graphical element settings associated with the recognized token.

9. The method of claim 1, wherein placing the graphical element within the area specified by the placement of the token comprises:
   identifying dimensions of the graphical element;
   comparing the dimensions of the graphical element to the area within the boundary determined based on the visual marking on the token;
   in response to the dimensions of the graphical element being greater than the area, adjusting the dimensions of the graphical element according to the area; and
   in response to the dimensions of the graphical element being equal to or less than the area, maintaining unchanged the dimensions of the graphical element.

10. The method of claim 1, further comprising:
    receiving user data from the user;
    retrieving a user profile associated with the user data, the user profile identifying at least one graphical element item and graphical element settings; and
    generating the graphical element based on the user profile using the at least one graphical element item and graphical element settings.

11. The method of claim 1, wherein receiving the image comprises receiving the image captured by a camera, the image projected onto the display surface by a projector.

12. The method of claim 1, wherein determining the boundary of the area based on the visual marking on the token comprises determining the boundary of the area based on visual code on the token.

13. A projector-camera system comprising:
    a projector to project an image onto a display surface, wherein the projector has a field of projection on the display surface;
    a camera to capture an image of at least a portion of the display surface on which a token comprising a physical object has been placed by a user, wherein the camera has a camera field of view that intersects the field of projection of the projector on the display surface;
    at least one processor to:
       receive the captured image from the camera;
       detect in the received captured image the token placed by the user on the display surface, the token having a visual marking;
       determine, based on the visual marking on the token, a boundary of an area for placing a graphical element to be displayed on the display surface; and
       place the graphical element corresponding to the token within the area specified by placement of the token on the display surface, wherein to place the graphical element within the area specified by the placement of the token, the at least one processor is to:
identify dimensions of the graphical element;
compare the dimensions of the graphical element to the area within the boundary determined based on the visual marking on the token;
in response to the dimensions of the graphical element exceeding the area, adjust the dimensions of the graphical element to fit within the area; and
in response to the dimensions of the graphical element not exceeding the area, maintain unchanged the dimensions of the graphical element.

14. The system of claim 13, wherein the at least one processor is to:
identify token data associated with the token based on the received captured image; and
generate the graphical element based on the token data.

15. The system of claim 13, wherein the graphical element has a set of graphical element items, wherein the set of graphical element items identify actions to be performed, and
wherein the at least one processor is to:
receive a selection by the user of a graphical element item from the set of graphical element items; and
perform the action identified by the graphical element item.

16. The system of claim 15, wherein the at least one processor is to:
receive user data from the user;
retrieve a user profile associated with the user data, the user profile identifying a security level for the user; and
determine whether to perform the action identified by the graphical element item based on the security level.

17. The system of claim 14, wherein the at least one processor is to:
check the token data for graphical element items;
in response to determining that the graphical element items do not exist in the token data, generate the graphical element with generic graphical element items; and
in response to determining that the graphical element items exist in the token data, use the graphical element items to generate the graphical element.

18. A non-transitory computer-readable storage medium storing instructions that when executed cause a system to:
receive an image of at least part of a display surface;
detect in the received image a token comprising a physical object placed by a user on the display surface, the token having a visual marking;
determine, based on the visual marking, a boundary of an area for placing a graphical element to be displayed on the display surface; and
place the graphical element corresponding to the token within the area specified by placement of the token on the display surface, wherein placing the graphical element within the area specified by the placement of the token comprises:
identifying dimensions of the graphical element;
comparing the dimensions of the graphical element to the area within the boundary determined based on the visual marking on the token;
in response to the dimensions of the graphical element exceeding the area, adjusting the dimensions of the graphical element to fit within the area and
in response to the dimensions of the graphical element not exceeding the area, maintaining unchanged the dimensions of the graphical element.

19. The non-transitory computer-readable storage medium of claim 18, wherein the instructions when executed cause the system to further:
receive a selection by the user of a graphical element item of the graphical element, wherein the graphical element item specifies an action to be performed;
retrieve a user profile identifying a security level for the user; and
determine whether to perform the action specified by the graphical element item based on the security level.

20. A projector-camera system comprising:
a projector to project an image onto a display surface, wherein the projector has a field of projection on the display surface;
a camera to capture an image of at least a portion of the display surface on which a token comprising a physical object has been placed by a user, wherein the camera has a camera field of view that intersects the field of projection of the projector on the display surface;
at least one processor to:
receive the captured image from the camera;
detect in the received captured image the token placed by the user on the display surface, the token having a visual marking;
determine, based on the visual marking on the token, a boundary of an area for placing a graphical element to be displayed on the display surface; and
place the graphical element corresponding to the token within the area specified by placement of the token on the display surface,
wherein the visual marking on the token comprises one of a barcode and a QR code.

* * * * *

UNITED STATES PATENT AND TRADEMARK OFFICE
CERTIFICATE OF CORRECTION

| | | |
|---|---|---|
| PATENT NO. | : 9,146,668 B2 | Page 1 of 1 |
| APPLICATION NO. | : 13/755035 | |
| DATED | : September 29, 2015 | |
| INVENTOR(S) | : Robert Walsh et al. | |

It is certified that error appears in the above-identified patent and that said Letters Patent is hereby corrected as shown below:

In the Claims

In column 14, line 13 approx., in Claim 18, delete "area" and insert -- area; --, therefor.

Signed and Sealed this
Tenth Day of May, 2016

Michelle K. Lee
*Director of the United States Patent and Trademark Office*